(12) United States Patent
Ramany et al.

(10) Patent No.: US 7,523,286 B2
(45) Date of Patent: Apr. 21, 2009

(54) SYSTEM AND METHOD FOR REAL-TIME BALANCING OF USER WORKLOAD ACROSS MULTIPLE STORAGE SYSTEMS WITH SHARED BACK END STORAGE

(75) Inventors: Swaminathan Ramany, Sunnyvale, CA (US); Vladimir Yakubov, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 387 days.

(21) Appl. No.: 10/992,893

(22) Filed: Nov. 19, 2004

(65) Prior Publication Data

US 2006/0112247 A1   May 25, 2006

(51) Int. Cl.
*G06F 13/00* (2006.01)

(52) U.S. Cl. .................. 711/170; 710/240; 711/154; 711/165; 718/105

(58) Field of Classification Search .............. 710/240; 711/154, 165, 170; 718/105
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,426,747 A | 6/1995 | Weinreb et al. | |
| 5,568,629 A | 10/1996 | Gentry et al. | |
| 5,581,724 A | 12/1996 | Belsan et al. | |
| 5,819,292 A | 10/1998 | Hitz et al. | |
| 6,516,380 B2 | 2/2003 | Kenchammana-Hoskote et al. | |
| 6,636,879 B1 | 10/2003 | Doucette et al. | |

(Continued)

FOREIGN PATENT DOCUMENTS

WO   WO 89/10594       11/1989
WO   WO 02/093298 A2   11/2002

OTHER PUBLICATIONS

Harris, Selwa. Partial International Seach Report for International Application No. PCT/US2005/041794, Jul. 25, 2006.

(Continued)

*Primary Examiner*—Sanjiv Shah
*Assistant Examiner*—Jae U Yu
(74) *Attorney, Agent, or Firm*—Cesari and McKenna LLP

(57) ABSTRACT

A system and method for real-time load balancing of user workload across a plurality of physical storage systems with shared back-end storage is provided. A load balancing process tracks usage metrics and determines a source and destination physical storage system and a virtual storage system (vfiler) to be migrated.

30 Claims, 9 Drawing Sheets

U.S. PATENT DOCUMENTS

| | | | |
|---|---|---|---|
| 6,643,654 | B1 | 11/2003 | Patel et al. |
| 7,194,597 | B2 | 3/2007 | Willis et al. |
| 2003/0056058 | A1 | 3/2003 | Veitch |
| 2004/0030668 | A1 | 2/2004 | Pawlowski |
| 2004/0139167 | A1 | 7/2004 | Edsall et al. |
| 2004/0210724 | A1* | 10/2004 | Koning et al. ............... 711/153 |
| 2005/0246401 | A1 | 11/2005 | Edwards et al. |
| 2007/0088702 | A1 | 4/2007 | Fridella et al. |

OTHER PUBLICATIONS

Administration Guide found at http://www.openafs.org/pages/doc/AdminGuide/auagd010.htm, visited on Mar. 2, 2005.
Basilico, et al., *Error Correction System Using "Shadow Memory,"* IBM Technical Disclosure Bulletin, May 1984, pp. 5792-5793.
Bitton, Dina, *Disk Shadowing,* Proceedings of the 14$^{th}$ VLDB Conference, LA, CA (1988).
Blasgen, M.W. et al., *System R:An architectural Overview,*Reprinted from IBM Systems Journal vol. 20, No. 1, 1981 © 1981, 1999.
Borenstein, Nathaniel S., *CMU's Andrew project a retrospective,* Communications of ACM, (39)12, Dec. 1996.
Brown, Mark R. et al., *The Alpine file system,* ACM Transactions on Computing Systems, 3(4):261-293, Nov. 1985.
Chen, Peter M., et al., *An Evaluation of Redundant Arrays of Disks Using an Amdahl* 5890 Performance Evaluation, pp. 74-85, 1990.
Chutani, Sailesh, et al., *The Episode file system,* In Proceedings of the USENIX Winter 1992.
Clark, B.E., et al., *Application System/400 Performance Characteristics,* IBM Systems Journal, 28(3): 407-423, 1989.
Data Sheet for the Check Point Software Technologies product Flood-Gate-1 (1997).
Dibble, Peter C., et al., *Beyond Striping: The Bridge Multiprocessor File System,* Computer Science Department, University of Rochester, Aug. 11, 1989.
Douglis, Fred, et al., *A comparison of two distributed systems: Amoeba and Sprite*—Computing Systems, 4(4), Fall 1991, pp. 353-385 ?{article I have has no date or cite}.
Gait, Jason, *Phoenix: A Safe In-Memory File System.* Communications of the ACM, 33(1):81-86, Jan. 1990.
Hartman, John H. et al., *Performance Measurements of a Multiprocessor Sprite Kemel,* Proceedings of the USENIX Conference, 1990.
Hitz, Dave et al., *File System Design for an NFS File Server Appliance,* Technical Report 3002, Rev. C395, presented Jan. 19, 1994.
Hitz, David, et al. *System and Method for Enabling a Storage System to Support Multiple Volume Formats Simultaneously,* USPTO U.S. Appl. No. 60/652,626, Feb. 14, 2005.
Howard, John H, et al. *Scale and Performance in a Distributed File System,* Carnegie Mellon University, CMU-ITC-87-068, Aug. 5, 1987.
Howard, John, H. et al., *Scale and Performance in a Distributed File System,* ACM Trans. Computer. System., 6(1), Feb. 1988 pp. 51-81.
Howard, John H., *An Overview of the Andrew File System,* Carnegie Mellon University, CMU-ITC-88-062.
*The IBM System/38,* Chapter 8, pp. 137-150.
Isomaki, Markus, *Differentiated Service for the Internet,* Department of Technical Physics and Mathematics, May 9, 1998.
Kazar, Michael L., et al., *Decorum File System Architectural Overview,* USENIX Summer Conference, Anaheim, California, 1990.
Lomet, David., et al., *The performance of a multiversion access method,* ACM SIGMOD International Conference on Management of Data, 19:353-363.
Lorie, Raymond, A, *Physical integrity in a large segmented database,* ACM Trans, Database Systems, (2)1: 91-104, Mar. 1977.
Lorie, RA, *Shadow Page Mechanism,* IBM Technical Disclosure Bulletin, Jun. 1986, pp. 340-342.
McKusick, Marshall Kirk, et al., *A Fast File System for UNIX,* Computer Science Division, Department of Electrical Engineering and Computer Sciences, Univ. of CA, Berkley, Feb. 18, 1994.
Miller, Ethan L., et al., *RAMA:A File System for Massively Parallel Computers,* 12$^{th}$ IEEE Symposium on Mass Storage Systems, Monterey CA, Apr. 1993, pp. 163-168.
Moons, Herman et al., *Location-Independent Object Invocation in Open Distributed Systems,* Autumn 1991 EurOpen Technical Conference and Exhibition, pp. 287-300 (Sep. 16-20, 1991).
Morris, James H., et al,*Andrew: A Distributed Personal Computing Environment,* Comm. of the ACM, vol. 29, Mar. 1986, pp. 184-201.
Mullender, Sape J., et al., *A distributed file service based on optimistic concurrency control,* ACM Symposium on Operating System Principles (Orcas Island, Washington). Published as Operating Systems Review, 19(5):51-62, Dec. 1985.
Muller, Keith, et al., *A High Performance Multi-Structured File System Design,* In Proceedings of the 13th ACM Symposium on Operating Systems Principles, Oct. 1991, pp. 56-67.
Morris, James H., et al, *Andrew: A Distributed Personal Computing Environment,* Comm. of the ACM, vol. 29, Mar. 1986, pp. 184-201.
Ousterhout, John K. et al., *The Sprite Network Operating System,* Computer Science Division, Department of Electrical Engineering and Computer Sciences, Univ. of CA, Berkley, Nov. 19, 1987.
Ousterhout, John et al., *Beating the I/O Bottleneck: A Case for Log-Structured File Systems,* Technical Report, Computer Science Division, Electrical Engineering and Computer Sciences, University of California at Berkeley, Oct. 30, 1988.
Ousterhout, John, *Why Aren't Operating Systems Getting Faster as Fast as Hardware?,* Digital WRL Technical Note TN-11, Oct. 1989.
Ousterhout, John, *A Brief Retrospective On The Sprite Network Operating System,* found at http://www.cs.berkeley.edu/projects/sprite/retrospective.html,visited on Mar. 11, 2005.
Patterson, D., et al., *A Case for Redundant Arrays of Inexpensive Disks(RAID),*$_{13}$ Technical Report, CSD-87-391, Computer Science Division, Electrical Engineering and Computer Sciences, University of California at Berkeley (1987).
Peterson, Zachary Nathaniel Joseph, *Data Placement for Copy-on-Write Using Virtual Contiguity,* University of CA, Santa Cruz, Master of Science in Computer Science Thesis, Sep. 2002.
Quinlan, Sean, *A Cached WORM File System,* Software-Practice and Experience, 21(12):1289-1299 (1991).
Redundant Array of Independent Disks, from Wikipedia, the free encyclopedia, found at http://en.wikipedia.org/wiki/RAID, visited on Mar. 9, 2005.
Rosenberg, J., et al., *Stability in a Persistent Store Based on a Large Virtual Memory,* In Security and Persistence, Rosenber, J. & Keedy, J.L. (ed), Springer-Verlag (1990) pp. 229-245.
Rosenblum, Mendel, et al., *The LFS Storage Manager,* Computer Science Division, Electrical Engin. And Computer Sciences, Univ. of CA, presented at Summer '90 USENIX Technical Conference, Anaheim, CA Jun. 1990.
Rosenblum, Mendel, et al., The *Design and Implementation of a Log-Structured File System* Jul. 24, 1991 pp. 1-15.
Rosenblum, Mendel, et al., *The Design and Implementation of a Log-Structured File System,* , In Proceedings of ACM Transactions on Computer Systems, (10)1:26-52, Feb. 1992.
Sandberg, Russel et al., *Design and implementation of the Sun Network Filesystem.* In Proc. Summer 1985 USENIX Conf., pp. 119-130, Portland OR (USA), Jun. 1985.
Santry, Douglas S., et al., *Deciding When to Forget in the Elephant File System,* Operating Systems Review, 34(5), (Dec. 1999) pp. 110-123.
Satyanarayanan, M., et al., *The ITC Distributed File System: Principles and Design,* In Proceedings of the 10th ACM Symposium on Operating Systems Principles, (19)5:56-67, Dec. 1985.
Satyanarayanan,.M.. *A survey of distributed file-systems.* Annual Review of Computing Science, 4(73-104), 1989.
Satyanarayanan, M., et al, *Coda: A highly available file system for a distributed workstation environment* Carnegie Mellon University, CMU-ITC.
Satyanarayanan, Mahadev, *Scalable, Secure, and Highly Available Distributed File Access,* Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *Laddis: The next generation in NFS file server benchmarking*, USENIX Association Conference Proceedings, Apr. 1993.

* cited by examiner

SYSTEM AND METHOD FOR REAL-TIME BALANCING OF USER WORKLOAD ACROSS MULTIPLE STORAGE SYSTEMS WITH SHARED BACK END STORAGE

FIELD OF THE INVENTION

The present invention relates to storage systems and, in particular, to balancing user workload across a plurality of storage systems having shared back end storage.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The storage system may be further configured to operate according to a client/server model of information delivery to thereby allow many client systems (clients) to access shared resources, such as files, stored on the storage system. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as SCSI embedded in Fibre Channel (FCP). One example of a SAN arrangement, including a multi-protocol storage appliance suitable for use in the SAN, is described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al.

It is advantageous for the services and data provided by a storage system, such as a storage appliance, to be available for access to the greatest degree possible. Accordingly, some storage systems provide a plurality of storage appliances in a cluster, with a property that when a first storage appliance fails, the second storage appliance ("partner") is available to take over and provide the services and the data otherwise provided by the first storage appliance. When the first storage appliance fails, the second partner storage appliance in the cluster assumes the tasks of processing and handling any data access requests normally processed by the first storage appliance. One such example of a storage appliance cluster configuration is described in U.S. patent application Ser. No. 10/421,297, entitled SYSTEM AND METHOD FOR TRANSPORT-LEVEL FAILOVER OF FCP DEVICES IN A CLUSTER, by Arthur F. Lent, et al. An administrator may desire to take a storage appliance offline for a variety of reasons including, for example, to upgrade hardware, etc. In such situations, it may be advantageous to perform a user-initiated takeover operation, as opposed to a failover operation. After the takeover operation is complete, the storage appliance's data is serviced by its partner until the partner transfers control back to the storage appliance.

In certain known storage appliance cluster configurations, the transport medium used for communication between clients and the cluster is Fibre Channel (FC) cabling utilizing the FCP protocol for transporting data. In SCSI terminology, clients operating in a SAN environment are initiators that initiate requests and commands for data. The multi-protocol storage appliance is thus a target configured to respond to the requests issued by the initiators in accordance with a request/response protocol. According to the FC protocol, initiators and targets have three unique identifiers, a Node Name, a Port Name and a Device Identifier. The Node Name and Port Name are worldwide unique, e.g. World Wide Node Name (WWNN) and World Wide Port Name (WWPN). A Device Identifier is unique within a given FC switching fabric and is assigned dynamically to the FC port by a FC switch coupled thereto.

In conventional failover techniques involving clusters of storage appliances, each storage appliance in the cluster maintains two physical FC ports, namely an A port and a B port. The A port is utilized for processing and handling data access requests directed to the storage appliance. The B port typically is in a standby mode; when a failover situation occurs, the B port is activated and "assumes the identity" of its failed partner storage appliance. At that point, the B port functions as a FC target to receive and handle data access requests directed to the failed storage appliance. In this way, the surviving storage appliance may process requests directed to both the storage appliance and its failed partner storage appliance. Such a conventional FC failover is further described in the above-referenced patent application entitled SYSTEM AND METHOD FOR TRANSPORT-LEVEL FAILOVER OF FCP DEVICES IN A CLUSTER.

Typically, a port of a "surviving" storage appliance assumes the identity of its failed partner storage appliance by servicing data access requests direct to a WWNN and a WWPN of the partner. For many client operating systems, this is sufficient to permit clients to transparently access the surviving storage appliance as if it were the failed storage appliance. After the surviving storage appliance assumes the identity of the failed storage appliance, data access requests directed to the network address of the failed storage appliance are received and processed by the surviving storage appliance. Although it may appear to the clients as if the failed storage appliance was momentarily disconnected and reconnected to the network, data operations or data access requests continue to be processed.

FIG. 1 is a schematic block diagram of an exemplary storage (appliance) system network environment 100. The environment 100 comprises a network cloud 102 coupled to a client 104. The client 104 may be a general-purpose computer, such as a PC or a workstation, or a special-purpose computer, such as an application server, configured to execute applications over an operating system that includes block access protocols. A storage system cluster 130, comprising Red Storage System 200A and Blue Storage System 200B, is also connected to the cloud 102. These storage systems are illustratively embodied as storage appliances configured to control storage of and access to interconnected storage devices, such as disks residing on disk shelves 112 and 114.

In the illustrated example, Red Storage System 200A is connected to Red Disk Shelf 112 by it's A port 116. The Red Storage System 200A also accesses Blue Disk Shelf 114 via its B port 118. Likewise, Blue Storage System 200B accesses Blue Disk Shelf 114 via A port 120 and Red Disk Shelf 112 through B port 122. Thus each disk shelf in the cluster is accessible to each storage appliance, thereby providing redundant data paths in the event of a failover. It should be noted that the Red and Blue disk shelves are shown directly connected to the storage systems 200 for illustrative purposes only.

Connecting the Red and Blue Storage Systems 200A, B is a cluster interconnect 110, which provides a direct communication link between the two storage systems. The cluster interconnect 110 can be of any suitable communication medium, including, for example, an Ethernet connection or a FC data link.

During normal cluster operation, the storage system that is connected to a disk shelf via the disk shelf's primary (i.e., A) port is the "owner" of the disk shelf and is primarily responsible for servicing data requests directed to blocks on volumes contained on that disk shelf. Thus, in this example, the Red storage system 200A owns the Red Disk is Shelf 112 and is primarily responsible for servicing data access requests for blocks contained on that disk shelf. Similarly, the Blue storage system 200B is primarily responsible for the Blue disk shelf 114. When operating as storage system cluster 130, each storage system 200 is typically configured to take over and assume data handling capabilities for the other disk shelf in the cluster 130.

A known storage system architecture provides the ability to create and maintain multiple instances of block-based virtual servers, such as virtual storage systems (vfilers), within a single physical server, such as a physical storage system platform. Vfilers are further described in U.S. patent application Ser. No. 10/035,664, entitled ARCHITECTURE FOR CREATING AND MAINTAINING VIRTUAL FILERS ON A FILER, by Mark Muhlestein, et al. Each vfiler is maintained and executed entirely independent of other vfilers on the platform. To that end, dedicated storage system resources, such as units of storage and network addresses of network interfaces, may be arbitrarily grouped and "hard" partitioned to establish security domains within the storage appliance. Yet common storage system resources, such as a storage operating system and a file system, may be shared among the vfilers.

A noted problem with storage environments having a plurality of physical storage systems, each with one or more vfilers executing thereon, is that the processing load on the physical storage systems may become imbalanced due to, for example, a vfiler experiencing higher than average load. Should several vfilers executing on a single physical storage system experience higher than average load, the physical storage system will suffer decreased performance, thereby adversely affecting the performance of each of the vfilers executing therein. Conventional vfiler migration may be utilized, for example, by a system administrator to attempt to redistribute the load. Conventional vfiler migration is further described in U.S. patent application Ser. No. 10/098,814, entitled REMOTE DISASTER RECOVERY AND DATA MIGRATION USING VIRTUAL APPLIANCE MIGRATION, by Wesley R. Witte, et al. However, typical load balancing techniques require an administrator to detect the over balanced vfiler and to take corrective action by initiating a migration.

SUMMARY OF THE INVENTION

The present invention overcomes the disadvantages of the prior art by providing a system and method for real-time balancing of a user workload across multiple physical storage systems with a shared back end storage. The storage systems are interconnected with disk shelves via a plurality of intermediate network devices, such as hubs. Each storage system includes a storage operating system having a target device driver module. A load balancing process executes within a management console in the storage system environment to collect performance data for each physical storage system, illustratively at routine time intervals. The load balancing process also computes metrics for each physical storage system using the collected performance data, typically over a set time, e.g., a trailing 30 minute window of average values. If any physical storage system exceeds a threshold value for any of the computed metrics, the process selects a source and destination physical storage system. The selected source physical storage system source is preferably a physical storage system having a high relative load. Whereas, the selected destination physical storage system is a physical storage system having a lower relative load. Usage tables of performance metrics are also computed for each vfiler executing in the source physical storage system. Application of a heuristic algorithm allows selection of a vfiler for migration from the source to the destination. The selected vfiler may then be recommended to the administrator for "manual" migration to the distributor. In alternate embodiments, the load balancing process may initiate "automatic" vfiler migration (i.e. without direct user intervention) of the selected vfiler from the source to destination.

BRIEF DESCRIPTION OF THE DRAWINGS

The above and further advantages of invention may be understood by referring to the following description in con- FIG. 1, previously described, is a schematic block diagram of an exemplary storage system cluster environment.

DETAILED DESCRIPTION OF ILLUSTRATIVE EMBODIMENTS

A. Clustered Storage System Environment

Figure 1:
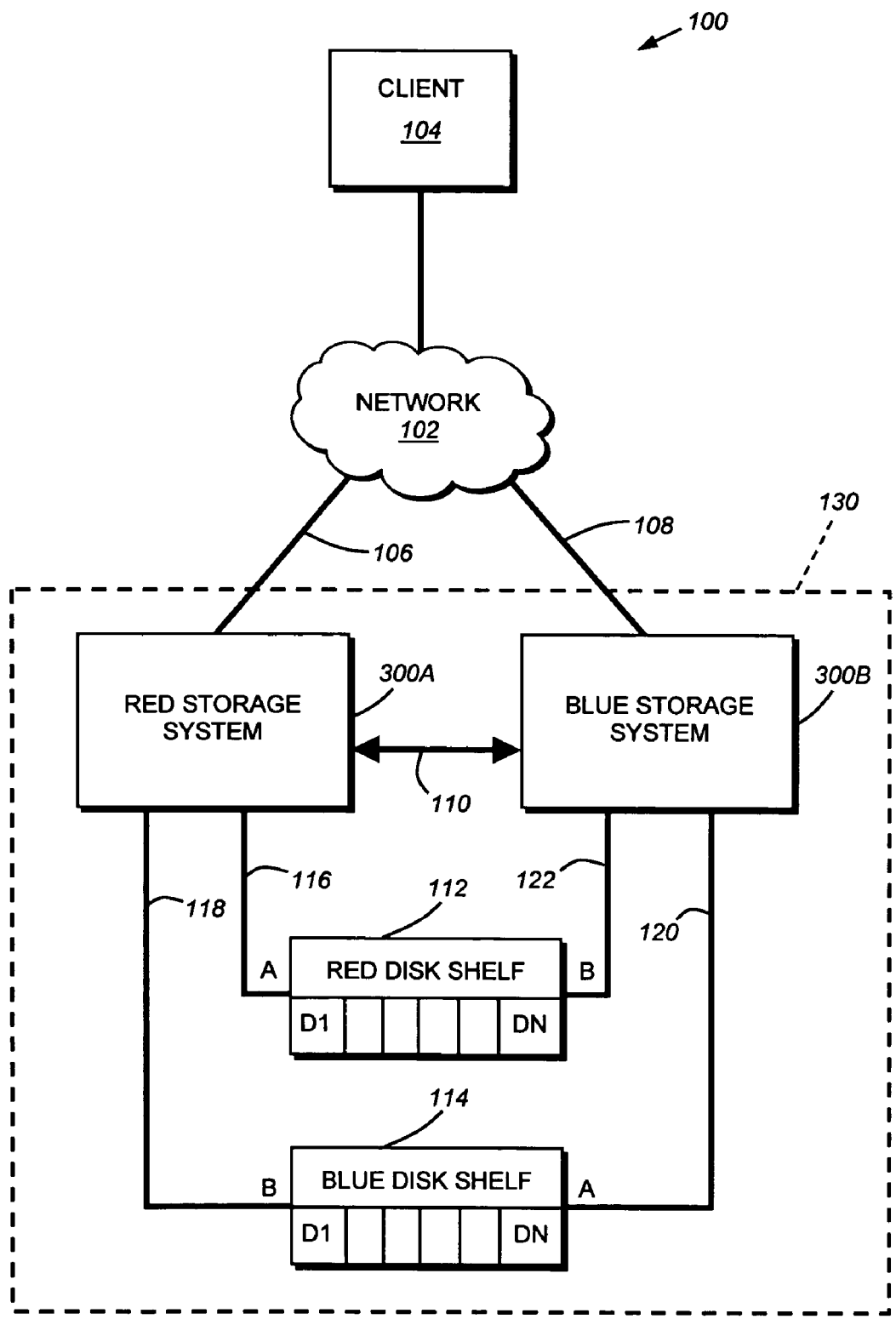
Figure 2:
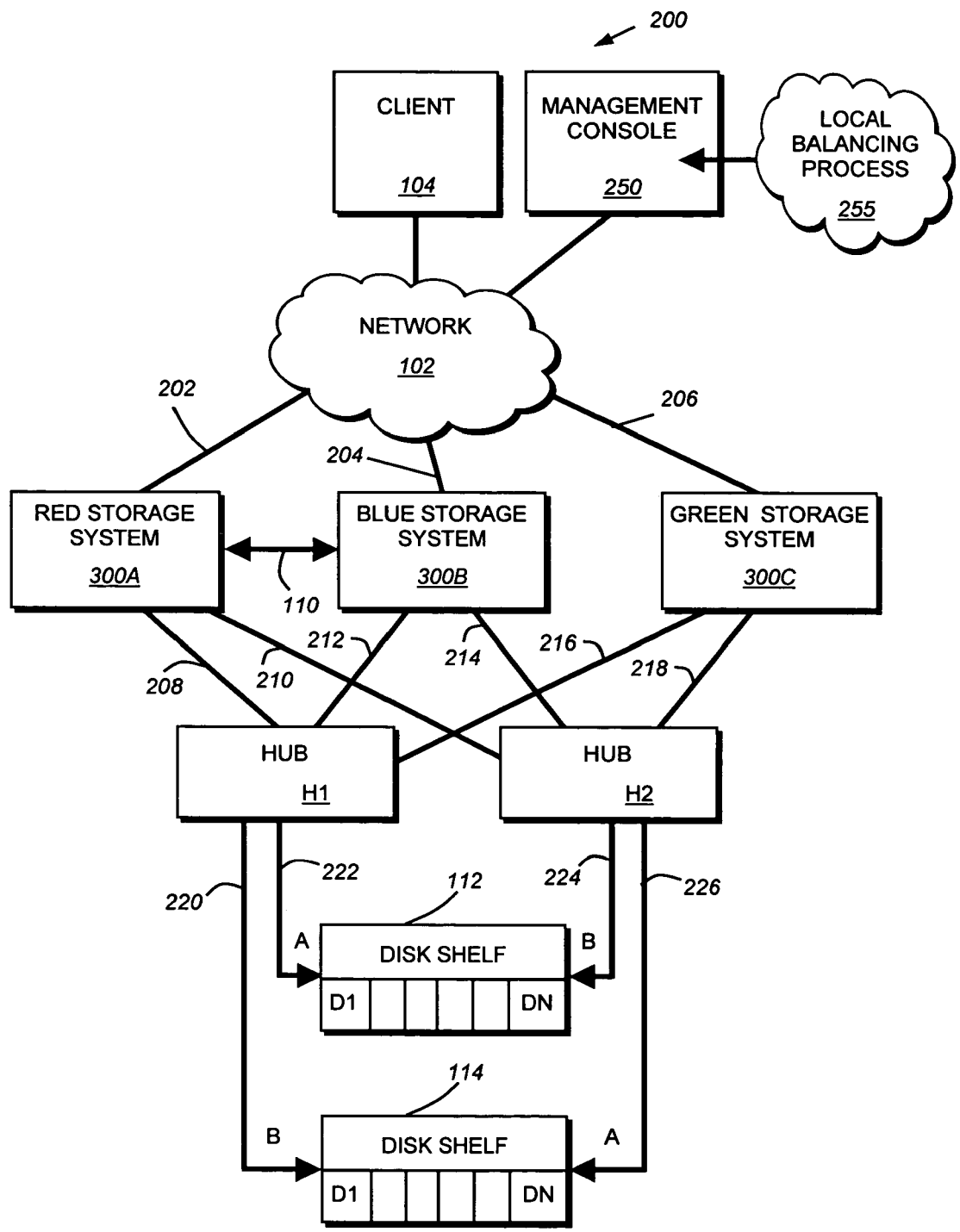
FIG. 2 is a schematic block diagram of an exemplary storage system environment in accordance with an embodiment of the present invention.

FIG. 2 is a schematic block diagram of an exemplary network environment 200 in which the principles of the present invention are implemented. The environment 200 comprises a network cloud 102 coupled to a client 104. The client 104 may be a general-purpose computer, such as a PC or a workstation, or a special-purpose computer, such as an application server, configured to execute applications over an operating system that includes block access protocols. A Red Storage System 300A, Blue Storage 300B and Green Storage System 300C are also connected to the cloud 102. These storage systems, described further below, are illustratively embodied as storage appliances configured to control storage of and access to interconnected storage devices, such as disks residing on disk shelves 112 and 114.

The Red, Blue and Green storage systems 300 A, B, C are connected to the network 102 via data pathways 202, 204, 206 respectively. These data pathways 202, 204, 206 may comprise direct point-to-point links or may represent alternate data pathways including various intermediate network devices, such as routers, switches, hubs, etc. Also in environment 200 are exemplary hubs H1 and H2 that are interconnected with the storage systems 300 A, B, C. Hub H1 is connected to disk shelf 112 via data connection 222 and also to disk shelf 114 via data connection 220. Similarly, H2 to is connected to disk shelf 112 via data access loop 224 and to disk shelf 114 via data access loop 226. In it should be noted that such a data access loop can be any acceptable networking media including, for example, a Fibre Channel Arbitrated Loop (FC-AL). In the illustrative embodiment, hubs H1 and H2 are interconnected with both the A and B ports of disk shelves 112, 114, thereby providing multiple data pathways to both disk shelves. Red storage system 300A is connected to hub H1 via data pathway 208 and to hub H2 via data pathway 210. Similarly, Blue storage system 300B is connected to hub H1 via data pathway 212 and to hub H2 via data pathway 214. Finally, Green storage system 300C is connected to hub H1 via data pathway 216 and to hub H2 via data pathway 218.

In the exemplary embodiment, hubs H1, H2 are utilized as intermediate network devices. However, it is expressly contemplated that other types of intermediate network devices, such as switches may be utilized in accordance with alternate embodiments of the present invention. As such, the use of hubs as intermediate network devices should be taken as exemplary only.

Also connected to network 102 is a management console 250 that includes a load balancing process 255 executing therein. The management console provides an administrator with a single point of management for all physical storage systems in the environment 200. The load balancing process 255, described further below, implements the novel load balancing technique of the present invention.

B. Storage Appliance

Figure 3:
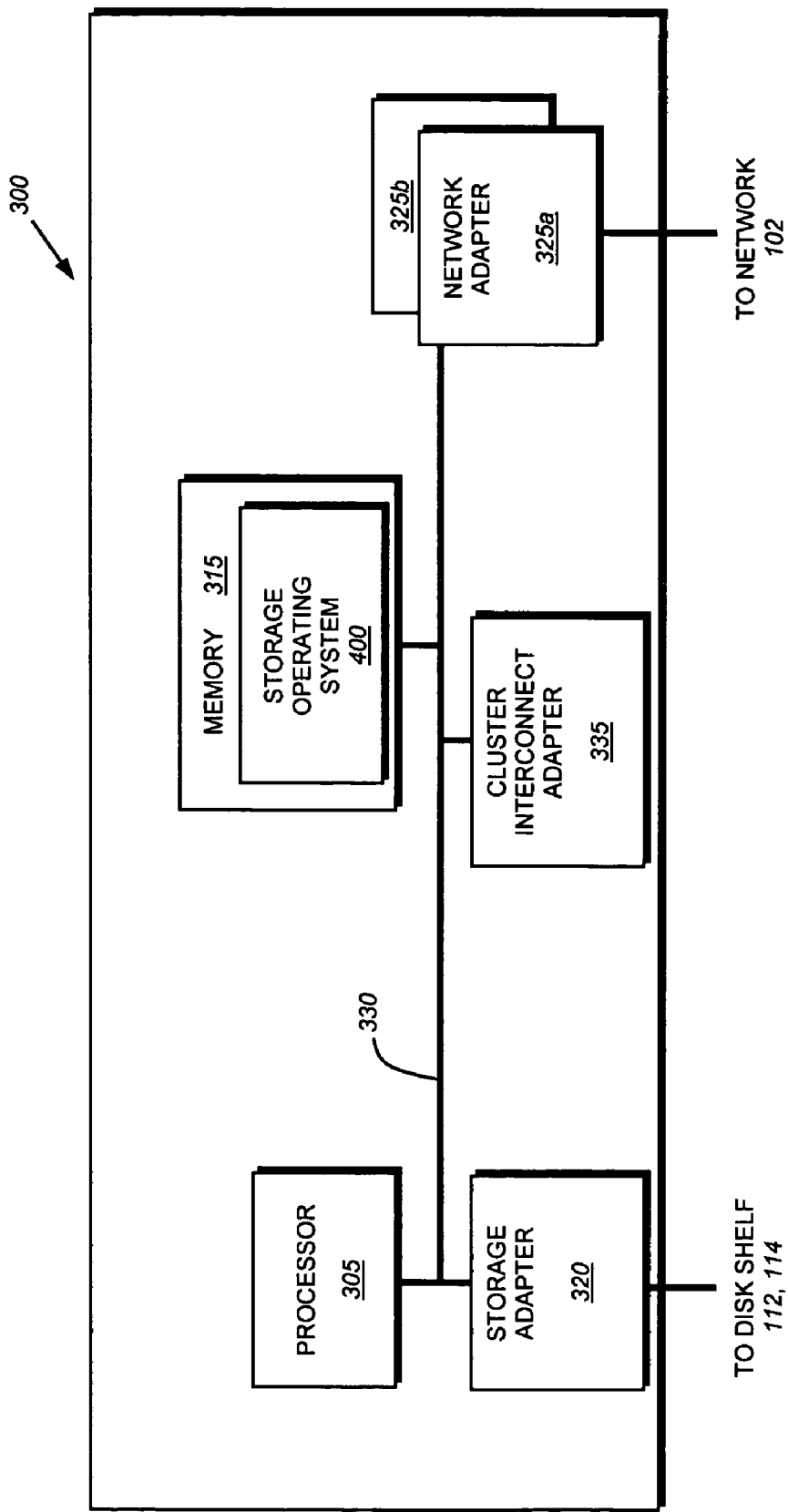
FIG. 3 is a schematic block diagram of an exemplary storage system in accordance with an embodiment of the present invention.

FIG. 3 is a schematic block diagram of an exemplary storage system 300 configured to provide storage service relating to the organization of information on storage devices, such as disks. The storage system 300 is illustratively embodied as a storage appliance comprising a processor 305, a memory 315, a plurality of network adapters 325a, 325b, a storage adapter 320 and a cluster interconnect adapter 335 interconnected by a system bus 330. A storage appliance is a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation. An example of such a storage appliance is further described in the above-referenced United States patent application entitled MULTI-PROTOCOL STORAGE APPLIANCE THAT PROVIDES INTEGRATED SUPPORT FOR FILE AND BLOCK ACCESS PROTOCOLS. Note that the terms "storage system" and "storage appliance" are used interchangeably. The storage appliance 300 also includes a storage operating system 400 that provides a virtualization system to logically organize the information as a hierarchical structure of directory, file and virtual disk (vdisk) storage objects on the disks.

Whereas clients of a NAS-based network environment have a storage viewpoint of files, the clients of a SAN-based network environment have a storage viewpoint of blocks or disks. To that end, the storage appliance 300 presents (exports) disks to SAN clients through the creation of luns or vdisk objects. A vdisk object (hereinafter "vdisk") is a special file type that is implemented by the virtualization system and translated into an emulated disk as viewed by the SAN clients. Such vdisks objects are further described in U.S. patent application Ser. No. 10/216,453 entitled STORAGE VIRTUALIZATION BY LAYERING VIRTUAL DISK OBJECTS ON A FILE SYSTEM, by Vijayan Rajan, et al. The multi-protocol storage appliance thereafter makes these emulated disks accessible to the SAN clients through controlled exports, as described further herein.

In the illustrative embodiment, the memory 315 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 325a and b couple the storage appliance to clients over point-to-point links, wide area networks (WAN), virtual private networks (VPN) implemented over a public network (Internet) or a shared local area network (LAN) or any other acceptable networking architecture. The network adapters 325a, b also couple the torage appliance 300 to clients 104 that may be further configured to access the stored information as blocks or disks. The network adapters 325 may comprise a FC host bus adapter (HBA) having the mechanical, electrical and signaling circuitry needed to connect the storage appliance 300 to the network 102. In addition to providing FC access, the FC HBA may offload FC network processing operations from the storage appliance's processor 305. The FC HBAs 325 may include support for virtual ports associated with each physical FC port. Each virtual port may have its own unique network address comprising a WWPN and WWNN.

The clients may be general-purpose computers configured to execute applications over a variety of operating systems, including the UNIX® and Microsoft® Windows™ is operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage appliance 300.

The appliance 300 supports various SCSI-based protocols used in SAN deployments, including SCSI encapsulated over TCP (iSCSI) and SCSI encapsulated over FC (FCP). The initiators (hereinafter clients 104) may thus request the services of the target (hereinafter storage appliance 300) by issuing iSCSI and/or FCP messages over the network 102 to access information stored on the disks. It will be apparent to those skilled in the art that the clients may also request the services of the integrated storage appliance using other block access protocols. By supporting a plurality of block access protocols, the storage appliance provides a unified and coherent access solution to vdisks/luns in a heterogeneous SAN environment.

The storage adapter 320 cooperates with the storage operating system 400 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 305 (or the adapter 320 itself) prior to being forwarded over the system bus 330 to the network adapters 325a and b, where the information is formatted into packets or messages and returned to the clients.

Storage of information on the multi-protocol storage appliance 300 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

To facilitate access to the disks, the storage operating system 400 implements a write-anywhere file system that cooperates with novel virtualization system code to provide a function that "virtualizes" the storage space provided by the disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Storage Operating System

In the illustrative embodiment, the storage operating system is the NetApp® Data ONTAP™ operating system that implements a Write Anywhere File Layout (WAFL™) file system. However, it is expressly contemplated that any appropriate file system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 4:
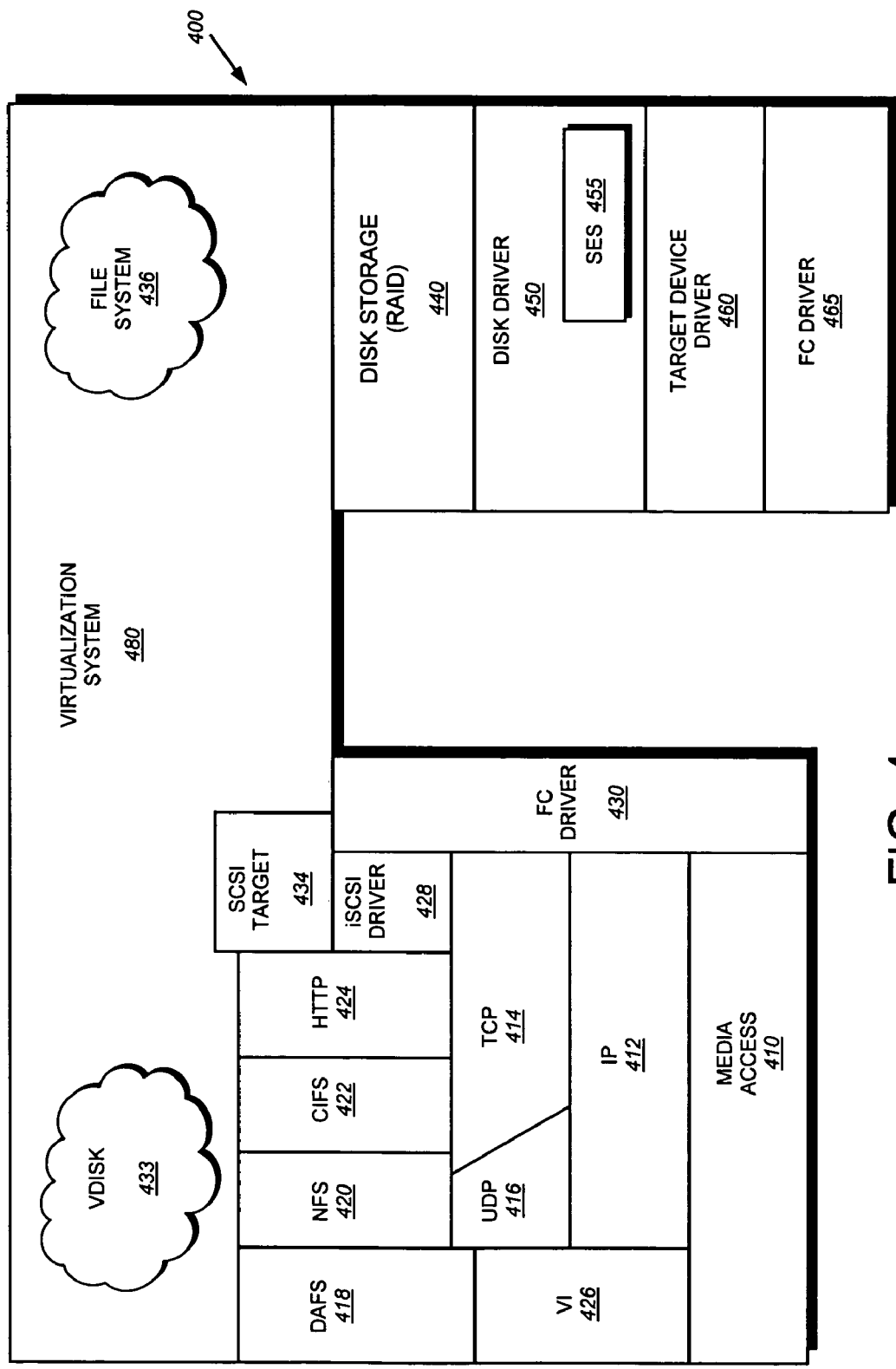
FIG. 4 is a schematic block diagram of an exemplary storage operating system in accordance with an embodiment of the present invention.

FIG. 4 is a schematic block diagram of the storage operating system 400 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access and, to that end, includes support for the Direct Access File System (DAFS) protocol 418, the NFS protocol 420, the CIFS protocol 422 and the Hypertext Transfer Protocol (HTTP) protocol 424. A Virtual Interface (VI) layer 426 implements the VI architecture to provide direct access transport (DAT) capabilities, such as Remote Direct Memory Access (RDMA), as required by the DAFS protocol 418.

An iSCSI driver layer 428 provides block protocol access over the TCP/IP network protocol layers, while a FC driver layer 430 operates with the FC HBA 325 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 440 that implements a disk storage protocol, such as a RAID protocol, and a disk driver layer 450 that implements a disk access protocol such as, e.g., a SCSI protocol.

A SCSI enclosure services (SES) module 455 operates in conjunction with the disk driver layer 450 to implement SES for the storage operating system 400. The SES module 455 utilizes a novel target device driver (TDD) module 460 to process incoming SES messages from other storage systems. As described further below, incoming SES messages are received by the TDD 460 and forwarded to the SES module 455 for processing. Responses are sent from the SES module 455 to the TDD module 460 for forwarding to an initiator via the FC driver 465. In the illustrative embodiment, the FC driver module 465 controls the storage adapter 320.

Bridging the disk software layers with the integrated network protocol stack layers is a virtualization system 480 that is implemented by a file system 436 interacting with virtualization software embodied as, e.g., vdisk module 433, and SCSI target module 434. These modules may be implemented as software, hardware, firmware or a combination thereof. The vdisk module 433 manages SAN deployments by, among other things, implementing a comprehensive set of vdisk (lun) commands that are converted to primitive file system operations ("primitives") that interact with the file system 436 and the SCSI target module 434 to implement the vdisks.

The SCSI target module 434, in turn, initiates emulation of a disk or lun by providing a mapping procedure that translates luns into the special vdisk file types. The SCSI target module is illustratively disposed between the FC and iSCSI drivers 428, 430 and the file system 436 to thereby provide a translation layer of the virtualization system 480 between the SAN block (lun) space and the file system space, where luns are represented as vdisks. By "disposing" SAN virtualization over the file system 436, the multi-protocol storage appliance reverses the approaches taken by prior systems to thereby provide a single unified storage platform for essentially all storage access protocols.

The file system 436 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

D. Virtual Storage Systems (vfilers)

The present invention may be utilized in an architecture that provides the ability to create and maintain multiple instances of block-based virtual servers, such as virtual storage systems (vfilers), within a single physical server, such as a physical storage system (appliance) platform. A vfiler is a logical partitioning of network and storage resources of the storage system platform to establish an instance of a multi-protocol server that is configured to service data access requests in response to block-based protocols, such as iSCSI. Each vfiler is maintained and executed entirely independent of other vfilers on the platform. To that end, dedicated storage systems resources, such as units of storage and network addresses of network interfaces, may be arbitrarily grouped and "hard" partitioned to establish security domains within the storage appliance. Yet common storage system resources, such as a storage operating system and a file system, may be shared among the vfilers.

Specifically, each vfiler is allocated a certain amount or subset of dedicated and distinct units of storage resources, and one or more dedicated and distinct network addresses. Each vfiler is also allowed shared access to the common file system on behalf of its client. Therefore, interpretations of a security object associated with, e.g., a client accessing the common file system may vary among vfilers. To address this, each vfiler is provided a vfiler context data structure (hereinafter "vfiler context") including, among other things, information pertaining to a unique and distinct security domain of the vfiler to thereby enable controlled access to allocated and shared resources of the vfiler.

For example, the vfiler context of a first vfiler ensures that users or clients of a first security domain can use a first set of source and destination network addresses when issuing requests to access a first subset of storage resources on the storage appliance. Similarly, the vfiler context of a second vfiler ensures that clients of a second security domain may use a second set of source and destination network addresses to access a second subset of storage resources. Notably, the clients of each security domain are unaware of each other's "presence" on the storage appliance and, further, are unable to access each other's storage resources.

Figure 5:
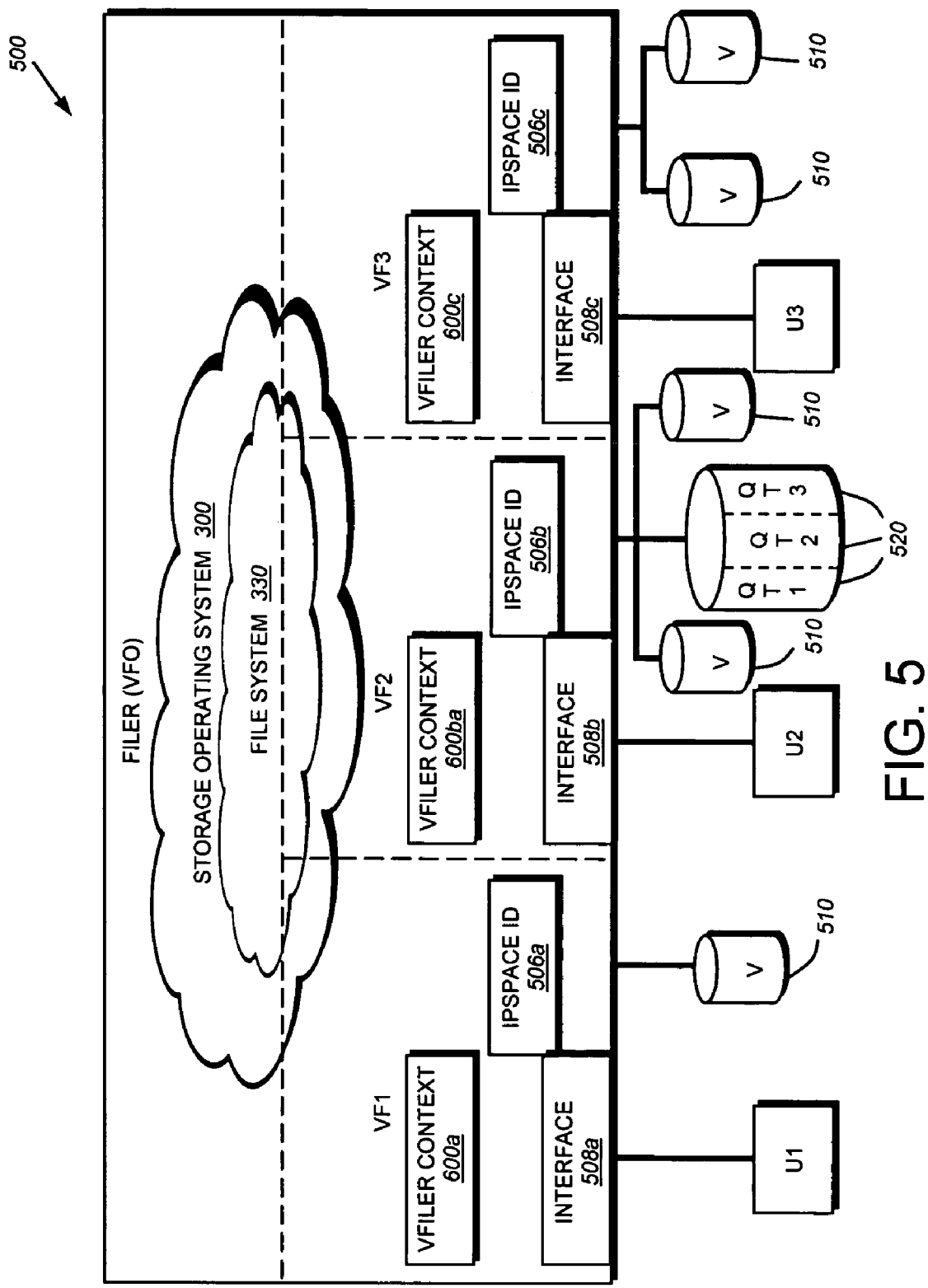
FIG. 5 is a schematic block diagram showing a plurality of vfilers executing within a physical storage system in accordance with an embodiment of the present invention.

FIG. 5 is a schematic diagram of an embodiment of a storage system platform 500 having a plurality of vfilers. Each vfiler may be embodied as a server, e.g., a CIFS or iSCSI server, which is referenced by a logical name, e.g., VF1-VF3. From the perspective of a client, each vfiler is separate and distinct from the other vfilers. Each vfiler VF1-VF3 is configured with one or more Internet Protocol (IP) addresses that may be assigned to one or more network interfaces 508a-c. In this context, the term network interface refers to an IP addressable interface, including a "physical" NIC and a "soft" NIC, such as a virtual interface (VIF), a virtual local area network (VLAN) and an emulated LAN (ELAN). Notably, a single NIC can support a plurality of IP addresses and, with such a configuration, multiple vfilers can effectively share a single NIC, if desired.

Each interface of the storage appliance is further assigned an IPspace identifier (ID) 506a-c that essentially "binds" the interface to an IPspace. An IPspace refers to a distinct IP address space in which the storage appliance and its storage operating system participate. A single storage appliance can support multiple IPspaces. Each vfiler is associated with an IP address space and, thus, belongs to one IPspace. The IP addresses within each IPspace must be unique. The IPspace is further described in U.S. patent application Ser. No. 10/035,666 entitled, TECHNIQUE FOR ENABLING MULTIPLE VIRTUAL FILERS ON A SINGLE FILER TO PARTICIPATE IN MULTIPLE ADDRESS SPACES WITH OVERLAPPING NETWORK ADDRESSES, by Gaurav Banga, et al.

The units of storage resources allocated to each vfiler include a volume or subvolume (qtree). A volume (V) 510 is a unit of storage comprising a file system or hierarchy of directories and files. A qtree, (QT1-3) 520, is a special directory similar to a mini-volume (mini-file system) or subdivision of a volume that has the property of being able to identify itself within a file system by, e.g., a qtree identifier (qtreeid) stored within an inode of a file. The vfiler architecture provides efficient utilization and management of these storage resources, including creation, assignment and mapping of the resources to and among the vfilers. For example, a virtual server (such as vfiler) and its associated storage resources (such as qtrees) may be migrated to a server (such as a storage system) and consolidated with other virtual servers (vfilers) having similarly named resources. Since the storage resources are allocated on a per-vfiler basis, such server consolidation and storage migration are transparent to a client because there is no change in the way the client refers to its data.

In the illustrative embodiment, each vfiler may own certain quanta of data, e.g., volumes and qtrees, which the vfiler is permitted to access. In addition, vdisks are not directly owned by a vfiler, but instead inherit the ownership attributes of the volume or qtree wherein they reside. Thus, if a vfiler can access a given volume or qtree, it can access any vdisks stored within those storage units. This simplifies storage unit ownership and is consistent with exemplary file-based vfilers, such as those described in the above-incorporated U.S. patent application entitled ARCHITECTURE FOR CREATING AND MAINTAINING VIRTUAL FILERS ON A FILER.

According to an aspect of the invention, a vfiler is created by the following CLI command of a UI associated with the storage operating system:

vfiler create [xyz][-s IPspace-name][-i IP address(s)][/vol/vol2][/vol/vol3/qt1]

wherein xyz is the name of the created vfiler, -s IPspace-name is the name of the IPspace to which the vfiler belongs and -i IP address(s) denotes a particular IP address or series of IP addresses of the vfiler. In addition, the notation /vol/vol2 is a first path descriptor to a first unit of storage, whereas the notation /vol/vol3/qt1 is a second path descriptor to a second unit of storage. The default vfiler is vfiler 0 (VF0) that is created at initialization upon booting of the physical storage appliance; VF0 is the only vfiler embodied in the storage appliance if no other vfilers are created. The default VF0 is associated with the physical storage appliance platform to enable access to, e.g., system resources that are unassigned after all resource assignments have been made for all vfilers on the storage appliance. When no vfilers are defined, VF0 includes all resources of the storage system.

Each vfiler maintains certain metadata in the root directory of the storage appliance. The metadata contains the various configuration files for the vfiler. This metadata is also mirrored to a hidden metadata directory in the root directory of the vfiler. Typically, the metadata is mirrored to the /etc directory of the vfiler. However, in alternate embodiments, the metadata may be mirrored to other locations within the vfiler directory structure. This hidden metadata directory is modified whenever the vfiler metadata is modified. The hidden metadata directory is typically utilized for vfiler migration, described further below.

Figure 6:
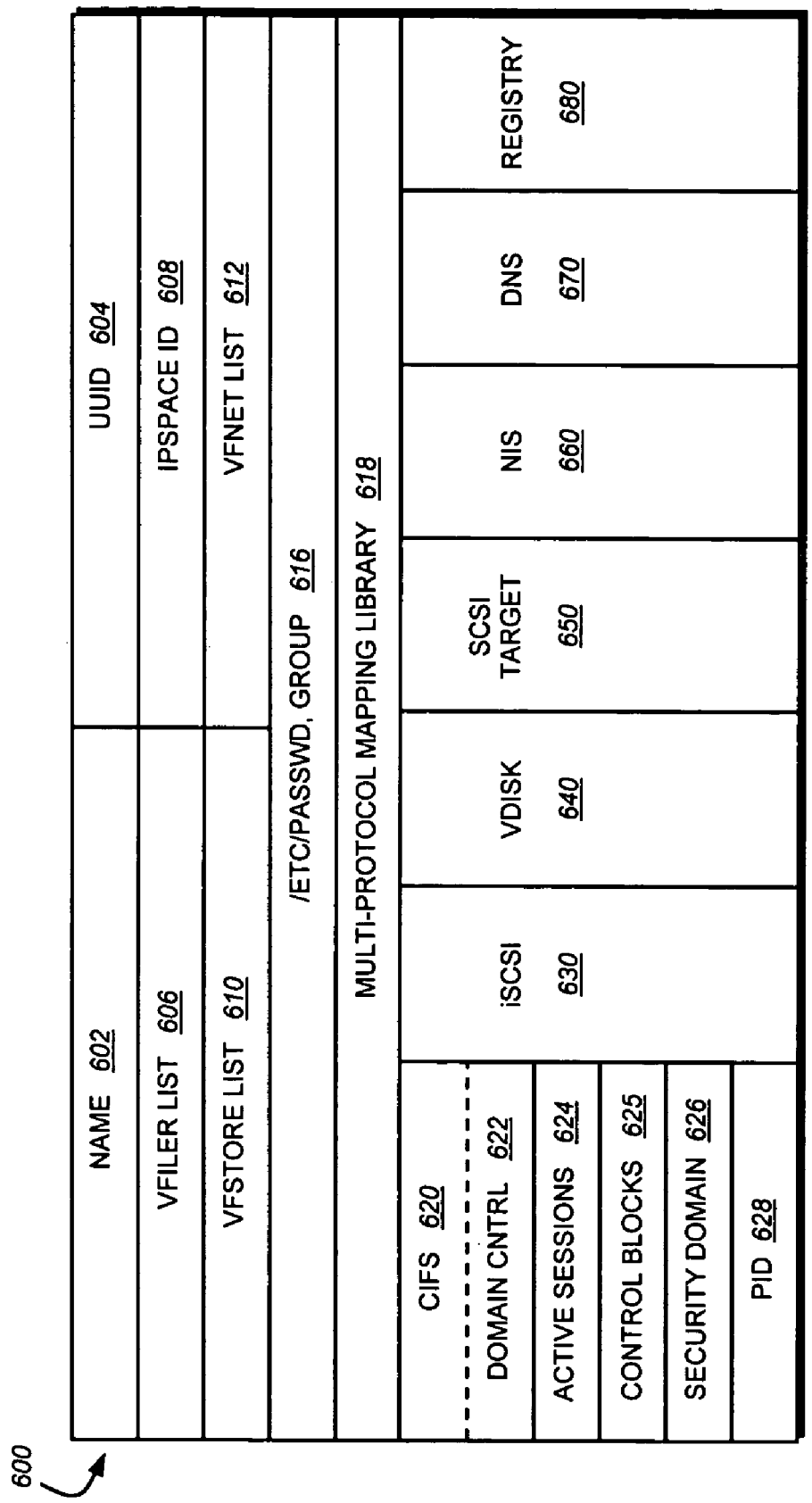
FIG. 6 is a schematic block diagram of an exemplary vfiler context in accordance with an embodiment of the present invention.

In particular, the vfiler create CLI command creates a vfiler context 600a-c for each vfiler. Note that a vfiler context is created for VF0 at initialization of the storage appliance. FIG. 6 is a schematic block diagram illustrating an in-core representation of a vfiler context 600 containing configuration information or "state" needed to establish an instance of a multi-protocol server. Multiple instances of these contexts provide the basis for the vfiler architecture. The vfiler context 600 includes fields for holding a name 602 of the vfiler and a universally unique identifier (UUID 604) that is created with the vfiler context. The UUID may comprise, e.g., the current time of day and a medium access control (MAC) address associated with the vfiler. A vfiler list field 606 contains a list of vfilers on the storage appliance platform and an IPspace indicator (ID) field 608 holds the IPspace ID of the vfiler.

According to the vfiler architecture, hardware resources, such as storage and network devices, are not directly assigned to the vfilers. Instead, software objects representing (in full generality) only a portion of the capabilities of these hardware devices are assigned to the vfilers. These software ("soft") objects correspond only to a "dynamically adjustable" portion of a hardware resource. The advantage of using soft objects for assignment to a vfiler is total flexibility in allocating, adding, moving and removing complete or portions of hardware resources between vfilers on a physical storage appliance. These operations can be accomplished very quickly using, e.g., a simple short-running console command as opposed to a complex, long-running procedure of re-configuring or copying hardware objects between hardware partitioning based conventional virtual servers. Therefore, other fields of the vfiler context structure 600 hold a list 610 of virtual filer storage (vfstore) structures (soft objects) and a list 612 of virtual filer network (vfnet) soft objects.

Resource mapping is defined as the mapping between soft objects that represent assigned resources of a vfiler (e.g., vfstore and vfnet objects) to portions of hardware resources, such as a qtree/volume and an ifnet structure. The vfstore and vfnet soft objects thus provide a level of indirection that represents the dynamically adjustable portions of capabilities of these hardware resources. That is, these soft objects are "linked" to other software objects (data structures) representative of the hardware resources in a manner that enables flexibility when "logically" reassigning those network and storage resources by, e.g., changing pointers of the objects. Such flexibility allows logical establishment of vfiler configuration changes at the file system level, as opposed to physical establishment by, e.g., manually rearranging the network and storage hardware resources.

Resource mapping in the vfiler architecture further enables efficient network and storage management with respect to, e.g., migration (assignment) of network and storage resources among vfilers. Network management refers to the set of data structures and algorithms that maintain the resource mapping between vfilers and their network resources as dynamic changes are made to the assignment of these resources and other changes on the filer platform. Storage management, on the other hand, refers to the set of data structures and algorithms that maintain the resource mapping between vfilers and their storage resources as dynamic changes are made to the assignment of these resources and other changes on the platform. Assignment changes include the addition, movement and removal of resources between vfilers. Other system changes include the creation of new NICs (VIFs and VLANs, or new devices) or the addition/on-lining/off-lining of storage volumes.

Network and storage management also includes the tasks performed on networking and storage objects when changes are made to the assignments of resources between vfilers. For example, TCP/IP connections and routing associated with an IP address must be reinitialized when the vfiler assignment of an IP address changes. Similarly, disk input/output operations that are in progress on a qtree or volume must be aborted, and quotas must be reinitialized when the vfiler assignment of a storage unit changes.

Each vfiler context 600 further includes a plurality of "module" data structures that includes all information (such as global variables) needed for an instance of a particular protocol or subsystem. For example, a CIFS module data structure 620 contains all information needed for an instance of the CIFS protocol, including information about contacting a domain controller 622, active sessions 624 for the protocol and various control blocks 625 associated with the CIFS protocol. The domain controller is a network server that accepts logon requests and initiates their authentication. Information pertaining to a security domain 626 is also provided to enable Windows®NT-type security for a CIFS request. The security information includes a security identifier comprising a domain portion and a relative ID (RID) portion, the latter RID being similar to the user ID of UNIX® security. In the case of Windows domain security, the security information also includes a trust relationship with the domain controller. The trust relationship signifies the ability of a vfiler to "trust" the domain controller to authenticate a user on behalf of the vfiler. Each CIFS module 620 also contains a process ID (PID 628) of the CIFS authentication process that enables the CIFS layer to send an authentication request to the correct CIFS authentication process.

There is a similar "per-module" data structure for each of the protocols and subsystems associated with a vfiler including, but not limited to, the iSCSI protocol 630, a vdisk data structure 640, a SCSI target 650, NIS subsystem 660, domain name service (DNS) subsystem 670 and registry 680. The NIS subsystem or "yellow pages" is a service locator for the NFS protocol that is implemented as a distributed database storing security information, such user and group IDs associated with each user password. The vdisk data structure contains pointers to various in-core data structures utilized by the vfiler for managing vdisks associated with the vfiler. The SCSI target data structure 650 is utilized by the vfiler for storing various per vfiler data, such as the identify of initiators that have logged into the vfiler and the current state of the various adapters.

E. Load Balancing

The present invention provides a system and method for real-time balancing of a user workload across multiple physical storage systems with a shared back end storage. The storage systems are interconnected with disk shelves via a plurality of intermediate network devices, such as hubs. Each storage system includes a storage operating system having a target device driver module. A load balancing process executes within a management console in the storage system environment to collect performance data for each physical storage system, illustratively at routine time intervals. The load balancing process also computes metrics for each physical storage system using the collected performance data, typically over a set time, e.g., a trailing 30 minute window of average values. If any physical storage system exceeds a threshold value for any of the computed metrics, the process selects a source and destination physical storage system.

The selected source physical storage system source is preferably a physical storage system having a high relative load. Whereas, the selected destination physical storage system is a physical storage system having a lower relative load. Usage tables of performance metrics are also computed for each vfiler executing in the source physical storage system. Application of a heuristic algorithm allows selection of a vfiler for migration from the source to the destination. The selected vfiler may then be recommended to the administrator for "manual" migration to the distributor. In alternate embodiments, the load balancing process may initiate "automatic" vfiler migration (i.e. without direct user intervention) of the selected vfiler from the source to distributor.

Figure 7:
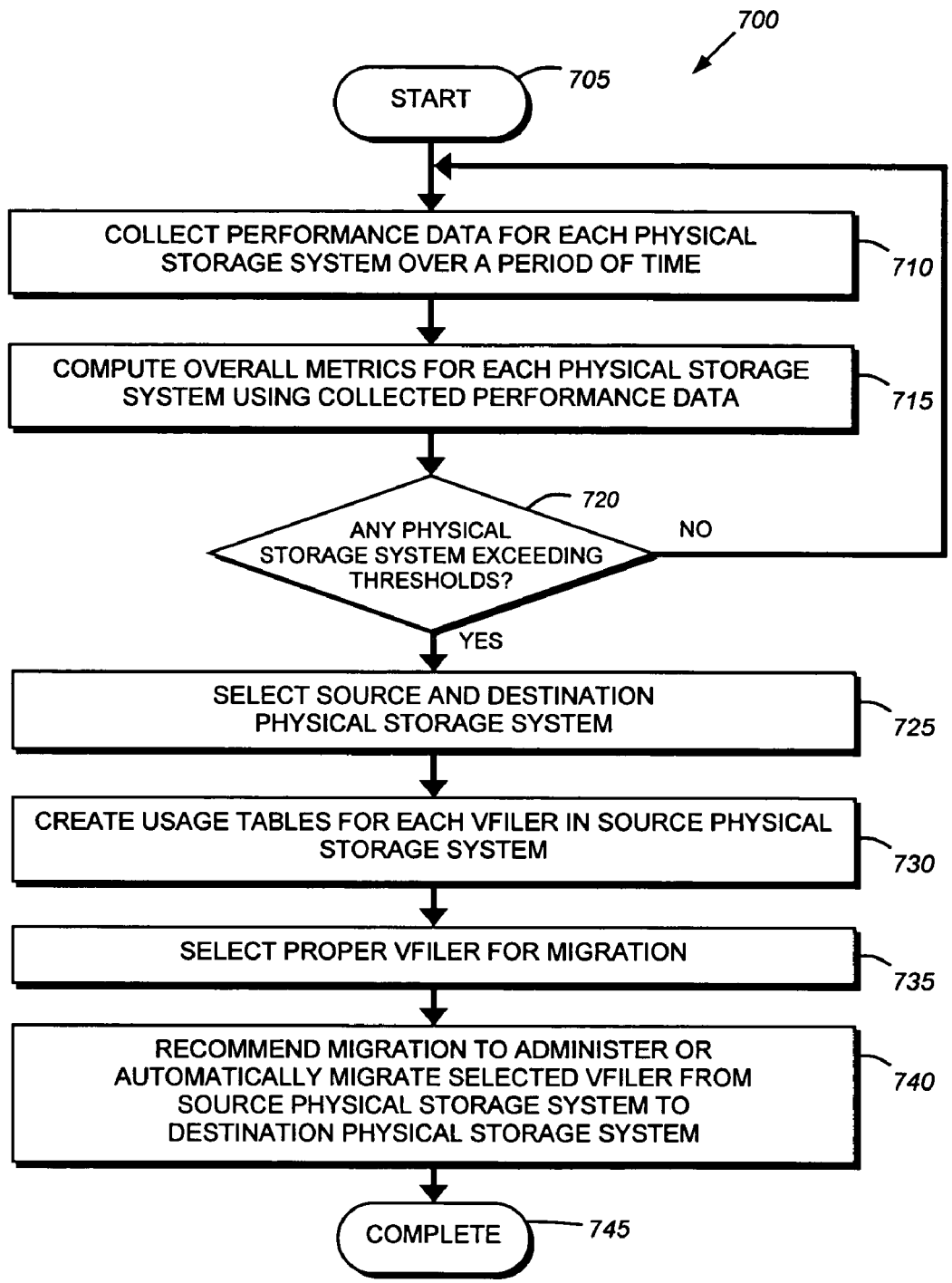
FIG. 7 is a flowchart detailing the steps of a procedure of for load balancing user workload among a plurality of storage systems in accordance with an embodiment of the present invention.

FIG. 7 is a flowchart detailing the steps of a procedure 700 for load balancing a user workload among a plurality of physical storage systems in accordance with an embodiment of the present invention. The procedure begins in step 705 and continues to step 710 where the load balancing process 255 collects performance data for each physical storage system over a period of time. This may be accomplished using conventional remote procedure calls (RPCs) to the physical storage system to gather performance data. In the illustrative embodiment, the load balancing process gathers this data at approximately one minute intervals; however, other intervals may be utilized in alternate embodiments of the invention to accommodate the specific needs of the storage system environment. The performance data may include, inter alia, the percentage utilization of the processor(s) in the physical storage system, the percentage of processing time spent in various domains, the number of operations directed to specific volumes or other data containers served by the physical storage system and the number of processors functioning on the physical storage system. It should further be noted that, as used herein, a domain identifies certain processes that cannot execute on two (or more) different processors simultaneously. In the illustrative embodiment, domain utilization is maintained as an array, with an entry for each domain utilized within the particular storage system architecture. It should be noted that additional or alternate performance data may be collected in alternate embodiments of the invention.

In step 715, the load balancing process computes a set of overall metrics for each physical storage system using the collected performance data. Illustratively, the performance metrics are computed as an average over a moving window of time to eliminate short-term spikes. For example, the metrics may be computed for a moving 30 minute window of time. That is, the overall metrics are computed as an average over the previous 30 minutes. The use of a moving window eliminates temporary spikes that may occur. Unless a system becomes overloaded for more than the moving window, load will not be re-balanced.

When computing the overall metrics for each physical storage system, at least two additional data points are collected: (i) the total spindle count for every volume in the physical storage system and (ii) the total capacity utilized by each volume associated with the physical storage system. Note that the spindle count is the number of physical disks associated with a given volume. Both of these data points may be collected using conventional RPC operations to the physical storage system. The load balancing process computes the sum of all of the spindle counts of all volumes to calculate a total spindle usage for the physical storage system. Similarly, a sum of all of the capacity used by all of the volumes is also calculated.

Other overall metrics may include, for example, a processor headroom percentage, a domain "headroom" percentage, a spindle headroom, a capacity headroom and a total number of operations per second. As used herein, the term headroom means, generally, the difference between the current utilization of a particular resource and the maximum utilization for that resource. The processor headroom percentage is computed by subtracting the average processor utilization from a maximum percentage. In a multiprocessor system, the average processor utilization is combined for each of the processors. In a single processor system, this maximum percentage may be set to, for example, 95%. For a two processor system this processor valued may be set to 180%. Similarly, in a four processor system, the maximum processor valued may be set to 300%. These values may differ for different physical storage systems and should be taken as exemplary only. The domain headroom percentage is calculated by subtracting the average percentage of headroom a usage from a preset percentage value. In the illustrative embodiment, this preset percentage value is set at 90%. It should be noted that this domain headroom percentage is calculated for each domain and thus an array of domain headroom percentages is generated during this step.

The spindle headroom is computed by subtracting the total computed number of spindles utilized by the physical storage system from a maximum number of spindles associated with the type of storage system. Each type of physical storage system has a specific maximum spindle number that is associated therewith. A capacity headroom is calculated by subtracting the total summed capacity of the physical storage system from a maximum capacity associated with the system. The total operations per second value is the average of the operations per second of the volumes associated with the physical storage system over the preceding window of time.

Once the overall metrics have been computed, the process then determines if any of the physical storage systems are exceeding predefined migration thresholds in step 720. Illustratively, these thresholds may be user adjustable to enable a system administrator to tune the performance of the storage system environment as desired. If no physical storage system exceeds at least one threshold, the procedure returns to step 710.

However, if a physical storage system exceeds the threshold, the procedure continues to step 725, where the load balancing process selects source and destination physical storage systems. In selecting an appropriate source physical storage system, two differing standards may be utilized: one for a single processor physical storage system, and the other for a multiprocessor physical storage system. In accordance with the illustrative embodiment of the invention, all physical storage systems in an environment must have the same number of processors.

If the source physical storage system are single processors types, the potential candidates for a source physical storage system are those storage systems where the CPU or processor headroom percentage is less than or equal to a predefined value, e.g., 15%. It should be noted that in alternate embodiments this value may be modified in accordance with the specific desires of the administrator or to accommodate hardware-specific issues. If there are multiple physical storage systems that satisfy this headroom test, the load balancing process ranks them by giving priority to storage systems with a lower processor headroom. Two or more physical storage systems having identical processor headroom may be randomly ordered. If no physical storage systems match the above criteria, i.e., no physical storage system has a processor headroom less than the predefined value, then migration is not required.

In a multiprocessor system, source physical storage systems may be identified as storage systems where the processor headroom is less than or equal to a predefined value or if the domain headroom (of any domain in the array of domains) is less than or equal to a predefined value. As this determination is made on a per domain basis, if any of the domains has a headroom less than or equal to the predefined value, the physical storage system is a candidate for migration. In the illustrative embodiment the processor headroom should be less than or equal to 30% or the domain headroom should be less than or equal to 10%. As noted above, these percentages are exemplary only and may differ by administrator desires or to be in compliance with hardware requirements. If there are multiple candidates for migration, the load-balancing process orders the candidates by giving priority to storage systems with the least amount of domain headroom. Again, in case of a tie, the candidates for migration are randomly ordered. If no candidates match any of the above criteria, then migration is not required.

The load balancing process utilizes a similar set of tests to select the destination physical storage system. In a single processor system, the load-balancing process selects as potential candidates for the destination those physical storage systems where the processor headroom is greater than or equal to a predefined value. In the illustrative embodiment, this predefined value is 25%. Multiple candidate machines are ordered by giving priority to those storage systems with the largest processor headroom. Similar to above, in the case of a tie, the candidate storage systems are randomly ordered. If there are no physical storage systems that match this criteria, then migration will not occur as there is no valid destination physical storage system.

Similar considerations are taken in determining the destination in a multiprocessor storage system. In a multiprocessor storage system, potential candidates for the destination storage system are those where the processor headroom is greater than or equal to a predefined value or the minimum headroom of any domain (of the array of domains) is equal to or greater than a predefined value. In the illustrative embodiment the processor headroom is greater than or equal to 60% or the domain headroom is greater than or equal to 20%. Should there be multiple candidates, the load-balancing process orders the storage systems in priority starting with the highest domain headroom. Again, if there are no physical storage systems that match this criteria, then migration does not occur as there is no valid destination physical storage system.

Once the source physical storage system has been selected, the load balancing process creates usage tables for each vfiler in the source physical storage system in step 730. Included with the usage table is a vfiler ratio (VR) that is calculated by dividing the number of average operations per second by the total physical storage system operations per second, i.e., VR= (vfiler operations per second)/(Physical storage system operations per second). The calculation of the VR may be used to construct a usage table. The usage table comprises a processor usage value, a domain usage percentage, a spindle usage and a capacity usage value. The processor usage percentage is defined as the VR multiplied by the average total processor utilization of the physical storage system, i.e., processor usage=VR*(average processor utilization of physical storage system). The domain usage percentage is computed by multiplying the VR by the average of each of the domain percentages, i.e., domain usage=VR*(average domain usage). The spindle usage is the spindle count for the volume and the capacity usage is a capacity utilized for the volumes serviced by vfiler.

Once the usage tables have been generated, the load balancing process, in step 735, selects the proper vfiler for migration. This is performed by first determining the appropriate vfiler candidates for migration, described further below in reference to FIGS. 8 and 9, and then selecting the candidate vfiler with the highest processor utilization percentage. The load balancing process then, in step 740, recommends migration of the selected vfiler to the administrator. In alternate embodiment, the load balancing process "automatically" migrates the selected vfiler from the source physical storage system the destination physical storage system. The procedure then completes in step 745.

Figure 8:
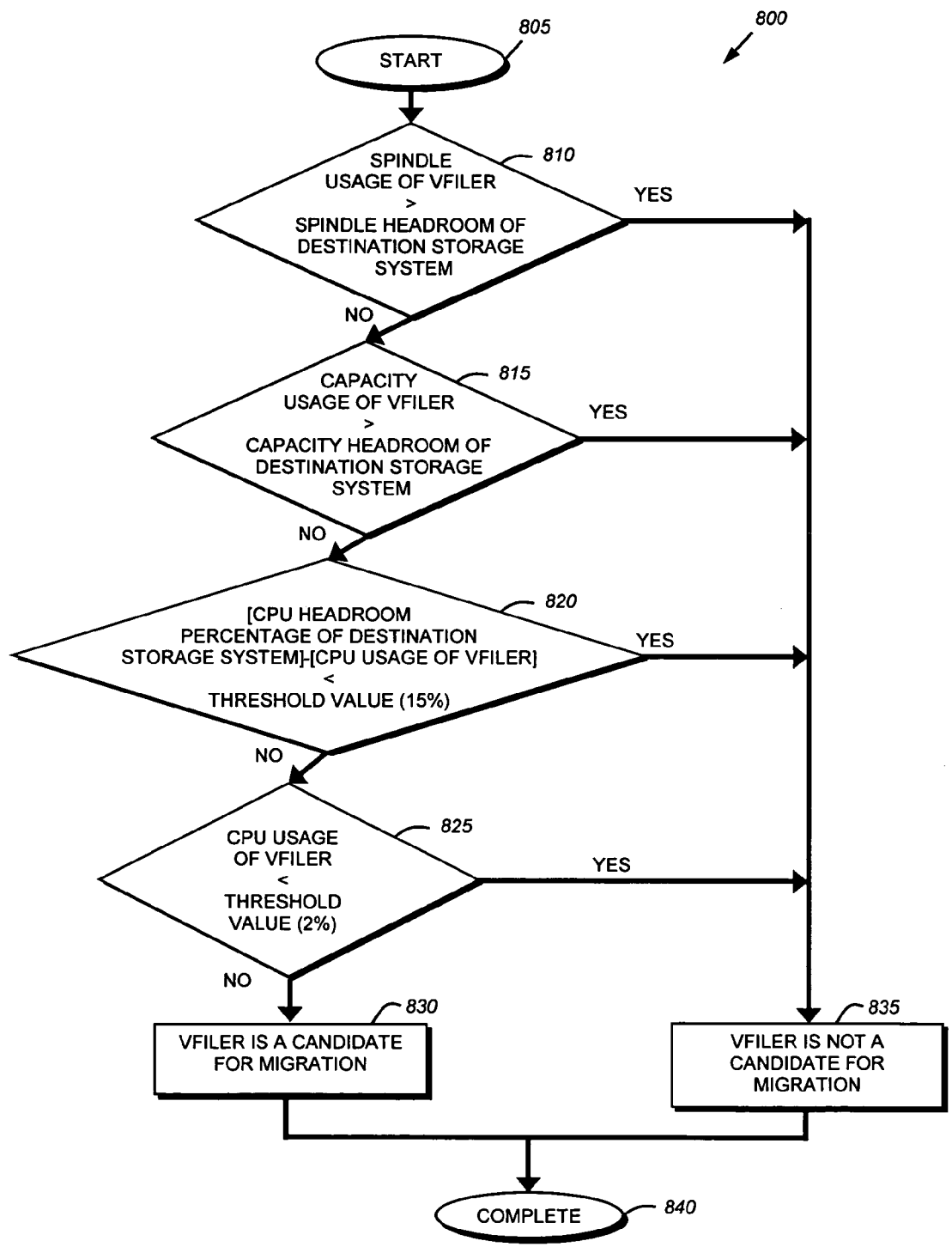
FIG. 8 is a flowchart detailing the steps of a procedure for determining a vfiler to migrate in a single processor system in accordance with an embodiment of the present invention.

FIG. 8 is a flowchart detailing the steps of a procedure 800 for determining whether a vfiler is a candidate for migration in an environment where the storage systems have a single processor in accordance with an embodiment of the present invention. The procedure begins in step 805 and continues to step 810 where a determination is made whether the spindle usage of the vfiler is greater then the spindle headroom of the destination storage system. If the spindle usage of the vfiler is not greater then the spindle headroom of the destination storage system, the procedure continues to step 815, where a determination is made whether the capacity usage of the vfiler is greater then the capacity headroom of the destination storage system. If the capacity usage of the vfiler is not greater then the capacity headroom of the destination storage system, the procedure continues to step 820 where a determination is made whether the processor headroom of the destination storage system minus the processor usage of the vfiler is less than a predefined threshold value, for example 15%. If this is less than the threshold value, the procedure continues to step 825 where a determination is made whether the processor usage of the vfiler is less than a predefined threshold value, for example 2%. If the CPU usage of the filer is not less than the predefined threshold, then the vfiler is identified as a candidate for migration in step 830. The procedure then completes in step 840. If, in steps 810-825, the condition being tested is met, then the process branches to step 835 and the vfiler is marked as not a candidate for migration. The procedure then completes in step 840. That is, a vfiler that meets any of the tests in procedure 800 is not a candidate for migration as it either will cause the destination physical storage system to exceed a threshold or because the vfiler is only using minimal resources (i.e., step 825).

Figure 9:
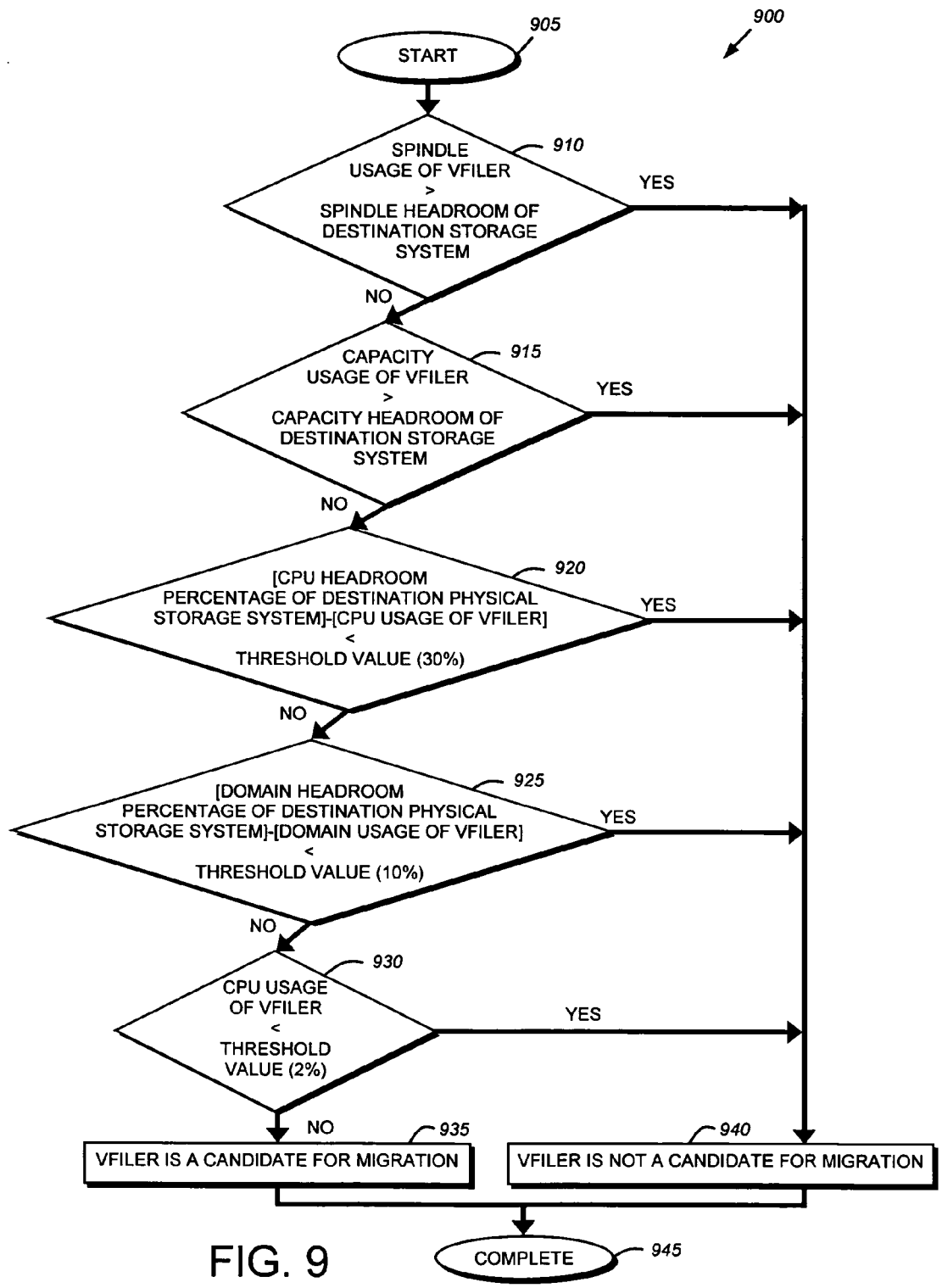
FIG. 9 is a flowchart detailing the steps of a procedure for determining a vfiler to migrate in a multiprocessor system in accordance with an embodiment of the present invention.

FIG. 9 is a flowchart detailing the steps of a procedure for determining whether a vfiler is a candidate for migration in a multiprocessor system in accordance with an embodiment of the present invention. The procedure begins in step 905 and continues to step 910 where a determination is made as to whether the spindle usage of the vfiler is greater than the spindle headroom of the destination storage system. If not, the procedure continues to step 915 where a determination is made as to whether the capacity usage of the vfiler is greater then the capacity headroom of the destination storage system. If not, the procedure continues to step 920 where a determination is made as to whether the processor headroom of the destination physical storage system minus the processor usage of the vfiler is less than a predefined threshold value, for example 30%. If not, the load balancing process continues to step 925 and determines if the domain headroom of the destination physical storage system minus the domain usage of the vfiler is less than a predefined threshold value, e.g., 10%. This calculation is illustratively performed on a per domain basis. Thus if the result of this calculation must be less than the predefined value for all domains. If not, the load balancing process then, in step 930, determines if the processor usage of the vfiler is less than a predefined threshold value, for example 2%. If all of these conditions are not met, i.e. no test is positive, the load balancing process then identifies the vfiler as a candidate for migration in step 935 before completing in step 945. However, should any of the tests in steps 910-930 result in a positive outcome, the procedure branches to step 940 and marks the vfiler as not a candidate for migration before completing in step 945.

To again summarize, the present invention is directed to a system and method for a load balancing a user workload across multiple storage systems with a shared back-end storage. A load balancing process executing on a management console routinely gathers performance data associated with the physical storage systems in the storage system environment. From this collected data a set of metrics are computer over a trailing time window. If any of these computed metrics exceed a predefined threshold value, the load balancing process identifies a source and destination physical storage system. Once the physical storage systems are identified, the load balancing process identifies a proper vfiler on the source to migrate to the destination. The load balancing process then identifies potential vfilers for migration and selects one using the highest processor percentage.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Additionally, while this description has been written in terms of a load balancing process performing various steps, it should be noted that the load balancing process' functionality may be implemented in each physical storage system. Furthermore, while various percentages are described in conjunction with the illustrative embodiment, these percentage values should be taken as exemplary only. Accordingly, this description is to be taken only by way of example and not to otherwise limit the scope of the invention. It is thus the object of the appended claims to cover all such variations and modifications as calm within the true spirit and scope of the invention.

What is claimed is:

1. A method for real-time balancing of workload across a plurality of physical storage systems, comprising:
   (a) collecting performance data for each of the plurality of physical storage systems, wherein each physical storage system shares access to a plurality of storage devices;
   (b) computing a set of overall metrics for each of the plurality of physical storage systems, wherein the set of overall metrics for each physical storage system are calculated over a moving window of time to obtain average values;
   (c) determining if any of the physical storage systems exceeds one or more predefined thresholds;
   (d) looping back to step (a), in response to determining that none of the physical storage systems are exceeding any of the one or more thresholds;
   (e) selecting a virtual storage system for migration from one of the plurality of physical storage systems to a destination storage system in response to determining that at least one of the physical storage systems exceeds one or more predefined thresholds, by
      (i) creating a usage table for each virtual storage system associated with each source physical storage system, wherein creating the usage table further comprises calculating a vfiler ratio (VR), wherein the vfiler ratio is equal to vfiler operations per second divided by physical storage system operations per second,
      (ii) selecting a source physical storage system and a destination physical storage system, and
      (iii) selecting the virtual storage system for migration; and
   (f) migrating the virtual storage system to the destination storage system, wherein the virtual storage system is accessed directly on the destination storage system using network resources assigned to the virtual storage system prior to migrating.

2. The method of claim 1 further comprising: recommending to an administrator that the selected virtual storage system be migrated.

3. The method of claim 1 wherein the performance data comprises a total number of operations per second and a percentage of processor utilization.

4. The method of claim 1 wherein the set of overall metric comprises a processor headroom, a domain headroom, a spindle headroom, a capacity headroom and a total number of operations per second.

5. A system for real-time balancing of workload across a plurality of physical storage systems, the system comprising:
   a load balancing process, the load balancing process configured to:
      (a) collect performance data for each of the plurality of physical storage systems;
      (b) compute a set of overall metrics for each of the plurality of physical storage systems, wherein the set of overall metrics for each physical storage system are calculated over a moving window of time to obtain average values;
      (c) determine if any of the physical storage systems exceeds one or more predefined thresholds;
      (d) loop, in response to determining that none of the physical storage systems exceed any of the one or more thresholds, back to action (a);
      (e) select a virtual storage system for migration from one of the plurality of physical storage systems to a destination storage system in response to determining that at least one of the physical storage systems is exceeding one or more predefined thresholds, by the load balancing system
         (i) creating a usage table for each virtual storage system associated with each source physical storage system,
         (ii) calculating a vfiler ratio (VR), wherein the vfiler ratio is equal to vfiler operations per second divided by physical storage system operations per second,
         (iii) selecting a source physical storage system and a destination physical storage system, and
         (iv) selecting the virtual storage system for migration; and
      (f) migrate the virtual storage system to the destination storage system, wherein the virtual storage system is accessed directly on the destination storage system using network resources assigned to the virtual storage system prior to migrating.

6. The system of claim 5 wherein the load balancing process is further configured to recommend to an administrator that the selected virtual storage system be migrated.

7. The system of claim 5 wherein the performance data comprises a total number of operations per second and a percentage of processor utilization.

8. The system of claim 5 wherein the set of overall metric comprises a processor headroom, a domain headroom, a spindle headroom, a capacity headroom and a total number of operations per second.

9. A system for real-time balancing of workload across a plurality of physical storage systems, the system comprising:
   means for collecting performance data for each of the plurality of physical storage systems;
   means for computing a set of overall metrics for each of the plurality of physical storage systems, wherein the set of overall metrics for each physical storage system are calculated over a moving window of time to obtain average values;
   means for determining if any of the physical storage systems is exceeding one or more predefined thresholds;
   means for looping, in response to determining that none of the physical storage systems are exceeding any of the one or more thresholds, back to the means for collecting;
   means for selecting a virtual storage system for migration from one of the plurality of physical storage systems to a destination storage system in response to determining that at least one of the physical storage systems is exceeding one or more predefined thresholds, by
      (i) creating a usage table for each virtual storage system associated with each source physical storage system, wherein creating the usage table further comprises calculating a vfiler ratio (VR), wherein the vfiler ratio is equal to vfiler operations per second divided by physical storage system operations per second,
      (ii) selecting a source physical storage system and a destination physical storage system, and
      (iii) selecting the virtual storage system for migration; and
   means for migrating the virtual storage system to the destination storage system, wherein the virtual storage system is accessed directly on the destination storage system using network resources assigned to the virtual storage system prior to migrating.

10. The system of claim 9 further comprising means for recommending to an administrator that the selected virtual storage system be migrated.

11. A computer readable media, comprising:
a processor;
said computer readable media containing instruction for execution on the processor for the practice of real-time balancing of workload across a plurality of physical storage systems, the instructions performing the steps of,
(a) collecting performance data for each of the plurality of physical storage systems;
(b) computing a set of overall metrics for each of the plurality of physical storage systems, wherein the set of overall metrics for each physical storage system are calculated over a moving window of time to obtain average values;
(c) determining if any of the physical storage systems exceeds one or more predefined thresholds;
(d) looping back to step (a), in response to determining that none of the physical storage systems are exceeding any of the one or more thresholds;
(e) selecting a virtual storage system for migration from one of the plurality of physical storage systems to a destination storage system in response to determining that at least one of the physical storage systems exceeds one or more predefined thresholds, by
 (i) creating a usage table for each virtual storage system associated with each source physical storage system, wherein creating the usage table further comprises calculating a vfiler ratio (VR), wherein the vfiler ratio is equal to vfiler operations per second divided by physical storage system operations per second,
 (ii) selecting a source physical storage system and a destination physical storage system, and
 (iii) selecting the virtual storage system for migration; and
(f) migrating the virtual storage system to the destination storage system, wherein the virtual storage system is accessed directly on the destination storage system using network resources assigned to the virtual storage system prior to migrating.

12. The method of claim 1, wherein the destination storage system has a lower relative load then the selected physical storage system.

13. The system of claim 5, wherein the destination storage system has a lower relative load then the selected physical storage system.

14. A method for real-time balancing of workload across a plurality of storage systems, comprising:
(a) collecting performance data for each of the plurality of storage systems;
(b) computing a set of overall metrics for each of the plurality of storage systems, wherein the set of overall metrics for each physical storage system are calculated over a moving window of time to obtain average values;
(c) determining if any of the storage systems exceeds one or more predefined thresholds;
(d) looping back to step (a), in response to determining that none of the storage systems are exceeding any of the one or more thresholds; and
(e) selecting a virtual storage system for migration from a source storage system to a destination storage system in response to determining that at least one of the storage systems exceeds one or more predefined thresholds, wherein the virtual storage system has one or more network resources and storage resources assigned to the virtual storage system wherein the virtual storage system selected has the highest processor utilization percentage;
(f) creating a usage table for each virtual storage system associated with the source physical storage system;
(g) calculating a vfiler ratio (VR), wherein the vfiler ratio is equal to vfiler operations per second divided by physical storage system operations per second; and
(h) migrating the virtual storage system to the destination storage system, wherein the virtual storage system is accessed directly on the destination storage system using the one or more network resources assigned to the virtual storage system prior to migrating.

15. The method of claim 14, wherein the destination storage system has a lower relative load then the source storage system.

16. The method of claim 14, wherein the source storage system is one of the plurality of storage systems and the source storage system exceeds one or more predefined thresholds.

17. The method of claim 14, further comprising:
recommending to an administrator that the selected virtual storage system be migrated.

18. The method of claim 14, wherein the performance data comprises a total number of operations per second and a percentage of processor utilization.

19. The method of claim 14, wherein the set of overall metric comprises a processor headroom, a domain headroom, a spindle headroom, a capacity headroom and a total number of operations per second.

20. A method for real-time balancing of workload across a plurality of physical storage systems, comprising:
(a) assigning one or more virtual storage systems to each physical storage system, wherein each virtual storage system is assigned one or more network resources and one or more storage resources;
(b) collecting performance data for each of the plurality of physical storage systems;
(c) computing a set of overall metrics for each of the plurality of physical storage systems, wherein the set of overall metrics for each physical storage system are calculated over a moving window of time to obtain average values;
(d) determining if any of the physical storage systems exceeds one or more predefined thresholds;
(e) looping back to step (b), in response to determining that none of the physical storage systems are exceeding any of the one or more thresholds;
(f) selecting a virtual storage system for migration from a source physical storage system to a destination physical storage system in response to determining that at least one of the physical storage systems exceeds one or more predefined thresholds, by
 (i) creating a usage table for each virtual storage system associated with the source physical storage system, wherein creating the usage table further comprises calculating a vfiler ratio (VR), wherein the vfiler ratio is equal to vfiler operations per second divided by physical storage system operations per second,
 (ii) selecting the source physical storage system and the destination physical storage system, and
 (iii) selecting the virtual storage system for migration; and
(g) migrating the selected virtual storage system to the destination physical storage system, wherein the selected virtual storage system is accessed directly on the destination physical storage system using the one more network resources assigned prior to migration.

21. The method of claim 20, wherein the destination storage system has a lower relative load then the source storage system.

22. The method of claim 20, wherein the source storage system is one of the plurality of storage systems and the source storage system exceeds one or more predefined thresholds.

23. A method for real-time balancing of workload across a plurality of physical storage systems, comprising:
   (a) assigning one or more virtual storage systems to each physical storage system, wherein each virtual storage system is assigned one or more network addresses and one or more storage resources;
   (b) collecting performance data for each of the plurality of physical storage systems;
   (c) computing a set of overall metrics for each of the plurality of physical storage systems, wherein the set of overall metrics for each physical storage system are calculated over a moving window of time to obtain average values;
   (d) determining if any of the physical storage systems exceeds one or more predefined thresholds;
   (e) looping back to step (b), in response to determining that none of the physical storage systems are exceeding any of the one or more thresholds;
   (f) selecting a virtual storage system for migration from a source physical storage system to a destination physical storage system in response to determining that at least one of the physical storage systems exceeds one or more predefined thresholds, by
      (i) creating a usage table for each virtual storage system associated with the source physical storage system, wherein creating the usage table further comprises calculating a vfiler ratio (VR), wherein the vfiler ratio is equal to vfiler operations per second divided by physical storage system operations per second,
      (ii) selecting the source physical storage system and the destination physical storage system, and
      (iii) selecting the virtual storage system for migration;
   (g) migrating the selected virtual storage system to the destination physical storage system; and
   (h) accessing the selected virtual storage system using a network address of the one or more network addresses to access the destination storage system without the source storage system forwarding a request to the destination storage system, wherein the one more network addresses are assigned to the selected virtual storage system prior to migration.

24. The method of claim 23, wherein the destination storage system has a lower relative load then the source storage system.

25. The method of claim 23, wherein the source storage system is one of the plurality of storage systems and the source storage system exceeds one or more predefined thresholds.

26. The method of claim 23, wherein the one or more network addresses of the selected virtual system are assigned to a physical port on a host storage system, wherein the host storage system is the destination storage system or the source storage system.

27. A system, comprising:
   a load balancing process executed on a computer, the load balancing process configured to:
      (a) collect performance data for each of the plurality of physical storage systems;
      (b) compute a set of overall metrics for each of the plurality of physical storage systems, wherein the set of overall metrics for each physical storage system are calculated over a moving window of time to obtain average values;
      (c) calculate a vfiler ratio for each virtual storage system, wherein the vfiler ratio is equal to vfiler operations per second divided by physical storage system operations per second;
      (d) determine if any of the physical storage systems exceeds one or more predefined thresholds using the vfiler ratio;
      (e) loop, in response to determining that none of the physical storage systems exceed any of the one or more thresholds, back to action (a);
      (f) select a virtual storage system for migration from a source physical storage system to a destination physical storage system in response to determining that the source physical storage system is exceeding one or more predefined thresholds; and
      (g) migrate the virtual storage system to the destination storage system, wherein the virtual storage system is accessed directly on the destination storage system using network resources assigned to the virtual storage system prior to migrating.

28. The system of claim 27, wherein the load balancing process is further configured to create a usage table for each virtual storage system associated with the source physical storage system.

29. A method, comprising:
   (a) collecting performance data for each of the plurality of physical storage systems, wherein each physical storage system shares access to a plurality of storage devices;
   (b) computing a set of overall metrics for each of the plurality of physical storage systems, wherein the set of overall metrics for each physical storage system are calculated over a moving window of time to obtain average values;
   (c) calculating a vfiler ratio for each virtual storage system, wherein the vfiler ratio is equal to vfiler operations per second divided by physical storage system operations per second;
   (d) determining if any of the physical storage systems exceeds one or more predefined thresholds using the vfiler ratio;
   (e) looping back to step (a), in response to determining that none of the physical storage systems are exceeding any of the one or more thresholds;
   (f) selecting a virtual storage system for migration from a source physical storage system to a destination physical storage system in response to determining that the source physical storage system is exceeding one or more predefined thresholds; and
   (g) migrating the virtual storage system to the destination storage system, wherein the virtual storage system is accessed directly on the destination storage system using network resources assigned to the virtual storage system prior to migrating.

30. The method of claim 29, wherein the step of selecting a virtual storage system for migration further comprises creating a usage table for each virtual storage system associated with the source physical storage system.

* * * * *

UNITED STATES PATENT AND TRADEMARK OFFICE
CERTIFICATE OF CORRECTION

PATENT NO. : 7,523,286 B2
APPLICATION NO. : 10/992893
DATED : April 21, 2009
INVENTOR(S) : Swaminathan Ramany It is certified that error appears in the above-identified patent and that said Letters Patent is hereby corrected as shown below:

Col. 3, Line 53, replace "Red Disk is Shelf 112" with "Red Disk Shelf 112"

Col. 7, Line 18, replace "torage" with "storage"

Col. 7, Line 32, replace "is oper-" with "oper-"

Signed and Sealed this

Twenty-third Day of November, 2010

David J. Kappos
*Director of the United States Patent and Trademark Office*